United States Patent Office.

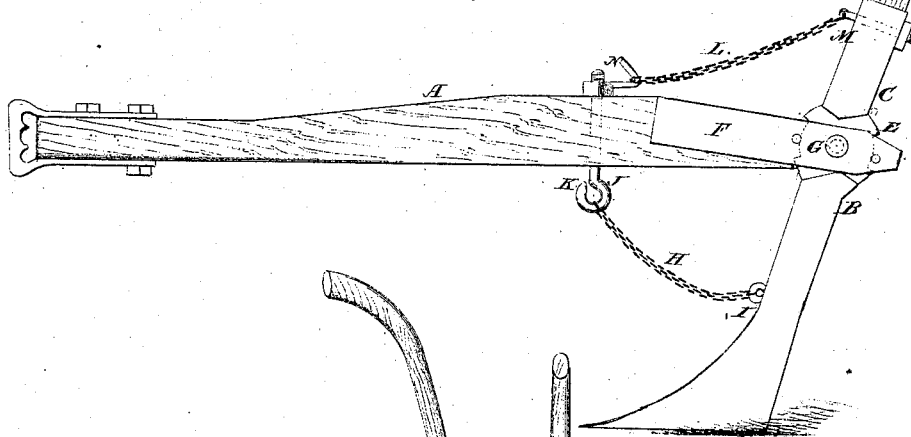
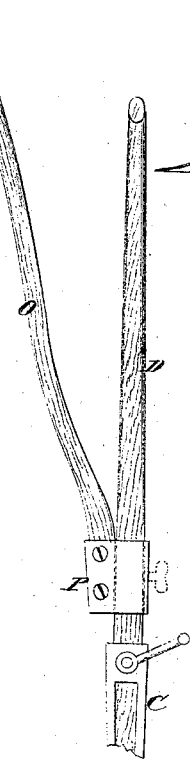

STEPHEN SIDNEY WOOD, OF BROOKLYN, NEW YORK.

Letters Patent No. 106,443, dated August 16, 1870.

IMPROVEMENT IN DITCHING-PLOW.

The Schedule referred to in these Letters Patent and making part of the same

To all whom it may concern:

Be it known that I, STEPHEN SIDNEY WOOD, of Brooklyn, in the county of Kings and State of New York, have invented a new and useful Improvement in Ditch-Plow; and I do hereby declare that the following is a full, clear, and exact description thereof, which will enable others skilled in the art to make and use the same, reference being had to the accompanying drawing forming part of this specification.

This invention relates to new and useful improvements in plows for cutting ditches, for laying drain-tile, draining off water, or other purposes; and consists—

First, in a device for adjusting the beam vertically, so that the pitch of the plow may be varied as the plow descends in the process of cutting the ditch; and Secondly, in an adjustable branch-handle on the standard-handle, by means of which the attendant is enabled to guide and control the plow as the plow descends, while walking on the surface of the ground, as hereinafter more fully set forth and described.

In the accompanying drawing—

Figure 1 represents a side view of a ditch-plow constructed according to my invention.

Figure 2 represents a rear view of the standard-socket and handle, showing the branch-handle and the manner in which it is made adjustable on the standard-handle.

Similar letters of reference indicate corresponding parts.

A is the beam.
B is the standard.
C is the standard-socket, which the main handle D of the plow enters.
E is a plate on the standard, to which the beam is adjustably secured by means of the straps F, attached to each side of the beam, which straps inclose the plate E and the pivot-bolt or rivet G.
H is the adjusting-chain, which is attached to the standard above the plowshare, as seen at I, and to the hook-bolt J, which passes through the beam, as seen at K.

L is a chain, which is attached to the handle-socket at M and to the hook-nut N of the bolt J, as seen in the drawing. This latter chain is merely for taking up the "slack" and keeping the beam in position when the plow is out of the ground.

The lower chain H governs the pitch of the plow. As the plow descends in cutting the ditch, the chain is let out, which allows the beam to rise and increase the pitch of the plow, so that the share will take to the ground as the line of draft is varied.

O is the adjustable handle, to the lower end of which is attached a band, P, which fits the main handle.

This band slides up and down on the main handle, and allows the branch-handle O to be adjusted to suit the depth of the plow and the convenience of the attendant.

This branch-handle is fastened in any desired position by means of a set-screw in the band, as indicated in the drawing.

The advantages of this plow over other plows must be obvious to all. It will be seen that the standard is a "land-side" from the share to the beam, which allows a straight wall to be cut for the sides of the ditch.

I do not confine myself to any particular method of uniting the plow share or mold-board to the standard, or to the general formation of the plow, otherwise than above described.

Having thus described my invention,

I claim as new and desire to secure by Letters Patent—

1. The branch-handle O, attached by an adjustable band, P, to the main handle, for the purpose specified.

2. The combination, in a ditching-plow, of plate E and straps F with a pivoted beam, A, each constructed and relatively arranged as and for the purpose specified.

STEPHEN SIDNEY WOOD.

Witnesses:
GEO. W. MABEE,
ALEX. F. ROBERTS.